US006180072B1

(12) United States Patent
Veal et al.

(10) Patent No.: US 6,180,072 B1
(45) Date of Patent: *Jan. 30, 2001

(54) PROCESS TO RECOVER METALS FROM SPENT CATALYST

(75) Inventors: Jack Thomas Veal, Sugar Land; Kevin Arnold Andersen, Katy; Ruth Mary Kowaleski, Houston, all of TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/306,134

(22) Filed: May 6, 1999

Related U.S. Application Data

(60) Provisional application No. 60/084,708, filed on May 8, 1998.

(51) Int. Cl.[7] ............................ C01G 39/00; C01G 41/00; C01G 31/00; C22B 34/20

(52) U.S. Cl. ................................ 423/54; 423/63; 423/53; 423/56; 423/67; 423/68

(58) Field of Search .................................. 423/54, 63, 53, 423/56, 67, 68

(56) References Cited

U.S. PATENT DOCUMENTS

| | | | |
|---|---|---|---|
| 3,458,277 | | 7/1969 | Platzke et al. ............................ 23/22 |
| 3,567,433 | * | 3/1971 | Gutnikov .............................. 423/53 |
| 3,681,016 | | 8/1972 | Litz ..................................... 23/15 W |
| 3,957,946 | | 5/1976 | Ronzio et al. .......................... 423/56 |
| 4,145,397 | * | 3/1979 | Toida et al. ............................ 423/54 |
| 4,382,068 | * | 5/1983 | Rokukawa ............................. 423/54 |
| 4,434,141 | * | 2/1984 | Hubred et al. .......................... 423/54 |
| 4,495,157 | * | 1/1985 | Sebenik et al. ......................... 423/54 |
| 4,514,369 | * | 4/1985 | Hubred et al. .......................... 423/54 |
| 4,666,685 | * | 5/1987 | Wiewiorowski ....................... 423/55 |
| 4,670,229 | * | 6/1987 | Wiewiorowski et al. ............. 423/55 |
| 5,013,533 | | 5/1991 | Howard et al. ....................... 423/133 |
| 5,066,469 | * | 11/1991 | Marcantonio ......................... 423/54 |
| 5,415,849 | | 5/1995 | Toyabe et al. .................... 423/150.2 |
| 5,431,892 | | 7/1995 | Toyabe et al. ......................... 423/54 |
| 5,900,383 | | 5/1999 | Davis et al. ........................... 502/22 |
| 5,923,184 | * | 8/1999 | Miller et al. ............................ 423/61 |

FOREIGN PATENT DOCUMENTS

0771881 A1    10/1996    (EP) .

OTHER PUBLICATIONS

"Spent Refinery Catalysts: Environment, Safety and Utilization," by Edward Furimsky, *Catalysis Today 30* (1996) pp. 223–286, No Month.

"Aluminum Sulfate," by F. A. Lowenheim and M. K. Moran, *Industrial Chemicals*, Fourth Edition, (1975) pp. 76–83, No Month.

"Solvent Extraction Process for Separation and Purification of Molybdenum and Vanadium by Tri–n–Butyl Phosphate in Xylene," by I. Komasawa, H. Hosoba and T. Otake, *Journal of Chemical Engineering of Japan*, vol. 2, No. 2, (1987) pp. 183–184, No Month.

"Recovery of Vanadium from Ash–Leaching Solutions by Solvent Extraction," by C. Giavarini, *FUEL*, vol. 61, Jun. 1982, pp. 549–552.

"Recovery of Vanadium From Oil–Fired Boiler Slag by Direct Leaching and Subsequent Solvent Extraction," by I. Tsuboi, M. Tamaki, J. Ingham, and E. Kunugita, *Journal of Chemical Engineering of Japan*, vol. 20, No. 5, (1987) pp. 505–510, No Month.

"The Impact of Solvent Extraction and Ion Exchange on the Hydrometallurgy of Tungsten and Molybdenum," by M. B. MacInnis and T.K. Kim, *J. Chem. Tech., Biotechnol.*, 1979, 29, pp. 225–231, No Month.

"Simultaneous Determination of Vanadium and Molybdenum as N–Benzoyl–N–Phenylhydroxamate Complexes by Combining Solvent Extraction and Liquid Chromatography," by M. G. Bagur, D. G. Evangelista, and M. Sanchez–Viñas, *Journal of Chromatography A*, 730 (1996) pp. 241–246, No Month.

"Photoreductive Stripping of Vanadium in solvent Extraction Process for Separation of Vanadium and Molybdenum," by T. Hirai, N. Onoe, and I. Komasawa, *Journal of Chemical Engineering of Japan*, vol. 26, No. 4, 1993, pp. 416–421, No Month.

"Separation and Purification of Vanadium and Molybdenum by Solvent Extraction Followed by Reductive Stripping," by T. Hirai and I. Komasawa, *Journal of Chemical Engineering of Japan*, vol. 23, No. 2, 1990, pp. 208–213, No Month.

"Electro–Reductive Stripping of Vanadium in Solvent Extraction Process for Separation of Vanadium and Molybdenum," by T. Hirai and I. Komasawa, *Journal of Chemical Engineering of Japan*, vol. 24, No. 1, 1991, pp. 124–125, No Month.

(List continued on next page.)

Primary Examiner—Steven Bos
(74) Attorney, Agent, or Firm—Beverlee G. Steinberg

(57) ABSTRACT

There is provided a process to reclaim metals from catalysts, said process comprising collecting one or more catalyst containing at least one metal sulfide; leaching the catalyst in an atmospheric leach step; separating the leached slurry into a first liquid stream and a first solid; leaching the first solid in a pressure leach process; separating the second leached slurry into a second liquid stream and a second solid; collecting the first and second liquid streams; oxidizing the combined liquid stream; cooling the oxidized liquid stream; adjusting the pH of the oxidized liquid stream; contacting the cooled oxidized liquid stream with an organic solvent containing an extractant; stripping the soluble metal species from the organic phase; adjusting the pH of the aqueous phase to selectively precipitate at least one metal as a metal salt; and separating the metal salt from the aqueous phase.

37 Claims, No Drawings

OTHER PUBLICATIONS

"Electro–Reductive Stripping of Vanadium in Solvent Extraction Process for Separation of Vanadium and Molybdenum Using Tri–n–Octylmethylammonium Chloride," by T. Hirai and I. Komasawa, *Hydrometallurgy*, 33 (1993) pp. 73–82, No Month.

"Solvent Extraction Behaviour of the Complexes of Titanium(IV), Vanadium(V), & Molybdenum(VI) with 3–(o–Hydroxyphenyl)–1–Phenyltriazene 1–Oxide," by S. C. Saha, S. Saha, & D. K. Dutta, *Indian Journal of Chemistry*, vol. 23A, Sep. 1984, pp. 787–789.

"Solvent Extraction of V(V) and Mo(VI) With Bis–(2–Ethyl Hexyl) Phosphoric Acid in Ligroin. A Mechanism and Separation Study," by R. K. Biswas, *Bangladesh J. Sci. Ind. Res.*, vol. XX, Nos. (1–4), 1985, pp. 11–24, No Month.

"Solvent Extraction of Molybdenum and Tungsten by Alamine 336 and DEHPA," by J. Coca, F. V. Diez, and M. A. Moris, *Hydrometallurgy*, 25 (1990) pp. 125–135, No Month.

"Solvent Extraction Concentration of Vanadium Leach Liquor," by M. S. Jakkiwar, R. H. Tupkary, V. M. Dokras, Visvesvaraya Regional College of Engineering, Nagpur, VI–6.1–6.13, No Date.

"Separation and Purification of Vanadium and Molybdenum by Solvent Extraction and Subsequent Reductive Stripping," by T. Hirai and I. Komasawa, *Solvent Extraction 1990*, 1992, pp. 1015–1020, No Month.

"Separation and Recovery of Rare Metals From Spent Hydrodesulfurization Catalysts by Solvent Extraction," by K. Inoue and P. Zhang, Third International Symposium on Recycling of Metals and Engineered Materials, The Minerals, Metals, & Materials Society, 1995, pp. 393–404, No Month.

"A Cyclic Process for Recovery of Metals From Spent Catalysts," by E. Wiewiorowski, R. Tinnin, R. Crnojevich, For Presentation at the Society of Mining Engineers Annual Meeting, Jan. 25–28, 1988, pp. 1–9.

"Solvent Extraction of W, MO, and V. Similarities and Contrasts," by J. E. Litz, Extr. Metal Refract. Met. Proc. Symp. 1981, pp. 69–81, No Month.

* cited by examiner

US 6,180,072 B1

PROCESS TO RECOVER METALS FROM SPENT CATALYST

This application claims the benefit of U.S. Provisional Application No. 60/084,708, filed May 8, 1998, the entire disclosure of which is hereby incorporated by reference.

FIELD OF THE INVENTION

This invention relates to a process for recovering products from spent catalyst, in particular for recovering and reclaiming metals, oils, and fuel-rich alumina product from petroleum processing catalysts.

BACKGROUND OF THE INVENTION

Petroleum hydrocarbons (oils) in and on spent catalyst feeds are known to inhibit metal reclaiming economics. The oils present on the catalysts block the catalyst pores and require more severe conditions to oxidize surface metals via hydrometallurgical oxidation. In addition, oils lead to undesirable organic contamination in leaching processes and recovered products. Methods commonly used to deoil catalyst, such as thermal deoiling or roasting, are unsatisfactory, leading to alumina reactions with metals at high temperatures and ultimately reduced metal yields.

Metals targeted for reclaiming are commonly recovered following removal of in-use generated petroleum coke. Coking of hydrotreating catalyst does not limit the metals recovery, but may impact processing kinetics due to catalyst pore plugging. The coke may impact reaction kinetics in hydrotreating by lowering diffusion rates due to catalyst pore plugging. Removal of the coke is costly and requires high temperature processing of 400° C. to 800° C. At the higher temperatures, the reaction is fairly rapid, making the process impossible to do in a gradual, controlled manner. Further, the process, which is exothermic at the surface of the catalyst, thermally stresses the catalyst surface and converts metals to less soluble species such as spinels. Therefore, a low temperature, controlled process is desirable.

To meet present day standards as a total reclaimer, oil must be recovered as a commercial product. The oil cannot be rendered as a waste stream in the deoiling process. In conventional high temperature treatments the oil is burned off with the coke, emitting carbon dioxide, carbon monoxide, and sulfur and nitrogen oxide byproducts. A more robust reclamation process minimizes air emissions and provides for recovery of the oil as a value-added product.

Metals present on the catalyst are present as a range of sulfides located in a variety of surface geologies. Some of the metal sulfides are readily oxidized in air at ambient temperatures, but other metal sulfides may require elevated temperatures and oxygen pressures to oxidize.

SUMMARY OF THE INVENTION

The present invention relates to an integrated process for the treatment of catalysts comprising alumina-containing carriers and metals(s) to recover said metal(s) therefrom, which process comprises the steps of:

a) collecting one or more catalyst, said one or more catalyst containing one or more metal as metal sulfide wherein said at least one of said one or more metal sulfide is selected from a molybdenum sulfide, a vanadium sulfide, a tungsten sulfide, and combinations thereof;

b) deoiling said one or more catalyst;

c) leaching said one or more catalyst in an atmospheric leach in the presence of air or oxygen at a pH greater than 9 for a time sufficient to convert in the range of about 50–70% of said one or more metal sulfide to soluble metal and sulfur species, thereby forming a first leached slurry comprising a first liquid stream containing soluble metal and sulfur species and a first solid;

d) separating said first leached slurry into said first liquid stream and said first solid;

e) leaching said first solid in a pressure leach process in the presence of air or oxygen at a pH greater than 9 for a time sufficient to convert greater than about 90%, based upon the metal sulfides present on the one or more catalyst before step (c), of said one or more metal sulfide to soluble metal and sulfur species, thereby forming a second leached slurry comprising a second liquid stream containing soluble metal and sulfur species and a second solid;

f) separating said second leached slurry into said second liquid stream and said second solid;

g) collecting said first liquid stream and said second liquid stream to form a combined liquid stream;

h) oxidizing said combined liquid stream;

i) contacting the oxidized liquid stream with an organic solvent containing an extractant effective to transfer soluble metal species into the organic, thereby creating a metal species containing organic phase and a substantially metals-free aqueous liquid containing sulfate;

j) recovering said substantially metals-free aqueous liquid containing sulfate;

k) stripping the soluble metal species from the organic phase in the presence of an aqueous ammonia solution, thereby forming an aqueous phase containing metal species;

l) adjusting the pH of the aqueous phase to selectively precipitate at least one metal as at least one ammonium metal salt; and m) separating said at least one ammonium metal salt from said aqueous phase and recovering said at least one ammonium metal salt.

DETAILED DESCRIPTION

The present invention is a process for recovering metals from spent petroleum refining catalyst without dissolving significant amounts of the catalyst matrix. A variety of catalyst sources may be used in the process; a commonality of the catalysts being they are made from alumina, alumina-silica or silica-alumina carriers. Without limiting the scope of the invention, the process will be described by the example of petroleum processing catalysts and, for simplicity, in particular a blend of alumina-based petroleum catalyst (hydrotreating catalyst), such as a residual/HDS feedstock, vanadium (V), nickel (Ni), cobalt (Co), and molybdenum (Mo) or tungsten (W) as the predominate metals, present as metal sulfides. The process of the invention solubilizes the metal sulfides into solution while keeping the majority of the alumina as a solid.

The amounts of metals, as metal sulfides, in each catalyst source are readily determined. The common metals present in hydrotreating catalyst include Mo or W, Co, V and Ni. In a preferred embodiment, sulfides at least two sulfides, such as sulfides of Mo, or W, and V, are present. The feed may be blended to a predetermined metal mix, such as Mo+V or a V/Mo ratio.

Certain catalysts, such as hydrodesulfurization (HDS) catalyst, undergo oxidation reactions when exposed to air.

When an HDS catalyst is processed, it should be mixed with a catalyst containing heavy oils, such as a residual catalyst, to provide a protective oil coating to aid in handling before and during the initial process steps. An overall blend of 75:25 to 50:50 residual:HDS has been found to work well in the process. A preferred blend is 75:25.

As mentioned, a residual catalyst typically arrives containing free oil, while an HDS typically contains less oil. It is desirable to remove the oils as one of the initial process steps. The HDS catalyst should remain dry prior to the deoiling process, wherein dry as used herein means water-free. One means of deoiling is solvent deoiling, which removes the petroleum hydrocarbons (oils) present on the feed without removing the coke. Deep deoiling of greater than 98% is accomplished by deoiling the feed in the presence of an organic solvent, such as toluene or xylene. Since the catalyst may become very reactive when deoiled, it is preferred to deoil under an inert atmosphere, such as nitrogen. Deoiling may be expedited by increasing temperature, but this increases the cost as use of a pressure vessel becomes necessary. Therefore, deoiling becomes a time versus cost consideration, with a desirable deoiling time of less than 12 hours. Following deoiling, the solvent is stripped from the feed, still under a nitrogen blanket, and the oil is separated from the solvent and recovered for further use. The deoiling step of the present invention minimizes dissolution of the catalyst matrix and does not remove coke.

The deoiled and solvent stripped feedstock may be slurried with a mild caustic, such as sodium hydroxide, at conditions which minimize oxidation, thereby forming a first slurry. The first slurry has a preferred pH of about 10–12. The temperature during slurrying is kept below the boiling point of water.

In order to facilitate the dissolution kinetics, the catalyst may be ground before or after deoiling and/or slurrying to improve process economics in the solid/liquid separation steps and increase process control in the oxidation steps. Deoiled catalysts are highly reactive and are typically cooled to ambient or near ambient temperature to grind. If grinding deoiled catalyst, it may be desirable to cool by quenching the deoiled catalyst with inert gas, such as nitrogen, and then slurrying with mild caustic prior to grinding.

The choice of whether and how much to grind is process related and dependent upon the equipment used. If the catalyst particles are too large they may settle in equipment and/or cause erosion problems as they flow through equipment. If ground too small, the particles may require more elaborate solid/liquid separation techniques downstream.

The metals present on the catalyst are present as a family of metal sulfides (e.g., $NiS$, $V_2S_3$, $MoS_2$, $CoS$). A key to the process of the present invention is controlling the reaction of the sulfides ($S^{2-}$) to soluble thiosulfates ($S_2O_3^{2-}$). Oxidation of the insoluble sulfide to soluble thiosulfate is quantitatively controlled using mild caustic oxidation. Sodium thiosulfate is a kinetically stable oxidation product at conditions less than 40° C. (105° F.), 15 psia $O_2$ and pH 12–13. Sulfides will oxidize to sulfate at relatively slow rates when temperatures are between 40–66° C. (105–150° F.), pHs between 11–12 and $O_2$ greater than 30 psig. Thiosulfate becomes quite unstable at temperatures greater than 148° C. (300° F.), $O_2$ greater than 60 psia, and pHs less than 10.5, and sulfides will be completely converted to sulfate under these conditions. The thiosulfate quantitatively decomposes and/or disproportionates at pH less than 9, temperature greater than 90° C. (194° F.) and/or $O_2$ partial pressures greater than 30 psia yielding products such as sulfur, sulfite, sulfide, or sulfate.

The deoiled, stripped and possibly ground and slurried feedstock is leached in an atmospheric leach. To maintain thiosulfate control, the pH of the leach should be adjusted to greater than 9 before introducing the leaching atmosphere. Preferably, leaching takes place in the presence of caustic and air or oxygen at atmospheric pressure at a temperature less than 60° C. and a pH range of about 10–13. The pH should be tightly controlled because if the pH falls too low, control of the leaching reaction is lost. Loss of control is believed to happen as follows: as the thiosulfate oxidizes to sulfates, an acid is formed, dropping the pH and requiring continuous addition of caustic to maintain the pH required for caustic leaching. Any acid formed in the pores of the catalyst particles can create a regime wherein a pore chemistry is quite different from the bulk. The alumina carrier will begin to solubilize as conditions become more acidic. Solubilized alumina may then either precipitate and block the pores, or co-precipitate with soluble vanadium species present in the liquor. Some of the vanadium co-precipitated with the alumina is lost to recovery unless the alumina is resolubilized. Controlling the thiosulfate slows this entire process down, reducing the need for added caustic.

The atmospheric caustic leach is conducted for a time sufficient to convert in the range of about 50–70% of the sulfides to soluble thiosulfate and sulfate species, thereby forming a first leached slurry. The pH is maintained at about 10–12. One advantage of this pH range is that certain metals which may be present but are not to be recovered in this process step, such as Fe, Ni, or Co, are not soluble at this pH. Although the atmospheric leaching process may be done in one step, 2 to 3 steps are preferred, with a 1 day residence time in each step. The use of more than one atmospheric leaching step allows the leach conditions to be varied in each step for optimum control of the leaching and oxidation reactions. Care must be taken in choosing residence time because if residence time is too long, the thiosulfate may oxidize to sulfate. Open tanks may be used, since only atmospheric pressure is desired.

The first leached slurry is separated into a first liquid stream, which contains the solubilized metal and sulfur species, and a first solid. The first solid may be slurried as before with fresh mild caustic to form a second slurry.

The first solid is moved to a pressure vessel for a pressure leach where air or oxygen pressure and temperature are increased to solubilize residual metal sulfides which exist in less soluble chemical forms or are less accessible due to particle morphology. Although one pressure leaching step using temperatures greater than 70° C. and oxygen partial pressures of greater than 10 psia may be used, two pressure leaching steps have been found to be effective.

In a first pressure leach, the first solid from the first leach is subjected to a temperature of about 75° C. and 10 psia oxygen. Since thiosulfate reacts to sulfate with acid or temperature or oxygen pressure, the residence time is maintained at a minimum. Total residence time in the first pressure leach vessel is about 90 minutes.

After the first pressure leach, the slurry is sent to a solid/liquid separation step. The removed liquor, which contains soluble Mo, V, and some $S_2O_3^{2-}$ is not subjected to the second pressure leach. Fresh caustic may be added to the solids and the solids, plus fresh caustic if added, are sent to a second pressure leach vessel. The second pressure leach is conducted at about 120° C. and 35 psia $O_2$. The pH is maintained at about 11. Residence time is about 90 minutes.

The solids recovered after a second solid/liquid separation process are substantially free of S, Mo and V, wherein "substantially free" as used in this steps means removal rates of as much as about 98% of the sulfur, about 97% of the molybdenum, and about 92% of the vanadium.

The metals (Mo and V) and soluble sulfur species removed from the solids during the atmospheric and pressure leaching steps are contained in the liquor. The liquors from the various separation steps are collected to form a combined liquid stream. This liquid stream contains fully oxidized metals ($Mo^{VI}$ and $V^V$) as well as soluble reduced metal species such as $V^{IV}$. The combined liquid stream is oxidized, preferably with oxygen or air. It has been found that a bubble column works well as the oxidation vessel, although standard autoclaves may also be used. The solution oxidation step fully oxidizes soluble metals to their highest oxidation state and converts any thiosulfate to sulfate.

The oxidation takes place at pH less than 10, temperatures greater than 150° C. and $O_2$/air pressure greater than about 50 psia. At this stage it becomes desirable to allow the thiosulfate to oxidize to sulfate in order to lower the pH of the liquor. The liquid stream to the solution oxidation process is controlled to a target pH of >6.5 across the oxidation zone and an exit pH of about 6.5. If the $S_2O_3^{2-} \rightarrow SO_4^{2-}$ reaction does not drop the pH sufficiently, an acid such as sulfuric acid ($H_2SO_4$) may be added to reach the desired exit pH.

The resulting oxidized solution is held at a pH of about 6.5 while cooling to allow trace alumina that has dissolved in the solution during the caustic leaching process steps to precipitate. An added benefit is that as alumina precipitates, it co-precipitates contaminants such as arsenic and phosphorus. Essentially, this holding and cooling step is a purification step to improve downstream metal recovery steps and prevent contaminants from reporting to the desired final metal products.

Following cooling, the precipitated solids are removed and the pH is adjusted to about 2.5, such as by addition of sulfuric acid.

The recovery of the soluble vanadium and molybdenum species is accomplished in a liquid-liquid ion exchange process. The liquor stream is contacted with an organic solvent which contains an extractant, such as an amine. The metals bond to the amine in the organic phase. Liquid-liquid ion exchange may be done in one step; however, two to three steps have been found to produce a final aqueous raffinate which is substantially free of metals. The use of a countercurrent flow is effective in the extraction process.

The metal-containing organic is sent to a stripping circuit, where the organic phase is contacted with an aqueous ammonium molybdate solution at a pH of about 6 and the molybdenum and vanadium are extracted into the aqueous ammonium molybdate solution. The vanadium is recovered from the high molybdenum aqueous solution by addition of ammonium hydroxide sufficient to increase the pH and precipitate ammonium metavanadate ($NH_4VO_3$). After removal of the precipitate, a portion of the liquid stream is steam stripped to remove ammonia. The pH of the resulting solution is lowered to about 2.5, sufficient to precipitate the molybdenum as ammonium molybdate (($NH_4$)$_4Mo_8O_{26} \cdot 4H_2O$, or similar species). The ammonium metavanadate is then washed and calcined to convert it to $V_2O_5$ and/or $V_2O_3$, and the ammonium molybdate is calcined to generate $MoO_3$. Ammonia is recovered during calcination.

In the example being described herein, the solids recovered after the pressure leach solid/liquid separation steps contain Ni and/or Co. The controlled oxidation process described previously is effective in preparing the recovered solids for selective leaching of Ni substantially free of contamination by other catalyst metals such as V, Mo, and Co. The Ni may be solubilized using an ammonia leach process. Ammonia leaching of Ni from reduced metal ores is a common practice which is typically done in an autoclave at a pH of 9–10. To recover the nickel, ammonia and some of the $CO_2$ are stripped from the leach solution to reduce the pH to about 7 and precipitate the nickel as a basic nickel carbonate. This process works well for reduced cobalt and nickel in lower oxidation states, although it is very difficult to recover the nickel separate from any cobalt present. Although conventional ammonia/ammonium carbonate leach processes typically used for nickel or cobalt recovery in reduced metal ores may be used, a variation has been found which allows recovery of the nickel with a low cobalt content from the solids generated in the caustic oxidation leach process.

In the present invention, the caustic oxidation process in the earlier processing steps results in more highly oxidized and less soluble nickel and cobalt species on the residual solids than is normally found in other nickel recovery processes. It is believed that this process leaves cobalt in a more oxidized and less soluble state than the nickel. In the present invention, the nickel leach is conducted at a pH range of about 10.5–12 in an aqueous ammonia/ammonium carbonate ($NH_4OH/(NH_4)_2CO_3$) solution at temperatures in the range of about 40° C. to 80° C. In this pH range, free ammonia above the buffering capacity of the ammonium hydrocarbonate is generated which allows solubilization of the oxidized nickel species and minimizes solubilization of the more highly oxidized cobalt species present on the solids.

The ammonia leach solution containing the solubilized nickel amine complex is then stripped with heat to remove ammonia. As the ammonia is removed, the pH is decreased to about 10–10.5 and a basic nickel carbonate is precipitated. The basic nickel carbonate may also contain residual vanadium species which were not solubilized in the earlier caustic oxidation steps. The precipitate is separated from the stripped liquor and may be further purified by subjecting it to sulfuric acid at pH less than 4 and temperatures up to 80° C. to dissolve the basic nickel carbonate. After filtering the sulfuric acid solution to remove insoluble metal impurities, the sulfuric acid solution containing soluble nickel is treated with sodium hydroxide or sodium carbonate to increase the pH to greater than 8 and precipitate nickel hydroxide (Ni(OH)$_2$) or nickel carbonate ($NiCO_3$) product.

The remaining leached solids are dried to remove residual ammonia. The leached solids are substantially free of metals and sulfur, but contain the coke which is not removed in the process of the present invention. The remaining coke on the alumina catalyst makes these solids attractive as a fuel-rich alumina product for use as a feedstock to other processes such as cement kilns. In addition, any residual metals remaining on the solids after the leaching processes described exist in insoluble forms which exclude the solids from classification as hazardous wastes according to current regulations.

It will be apparent to one of ordinary skill in the art that many changes and modifications may be made to the invention without departing from its spirit or scope as set forth herein.

We claim:

1. A process to reclaim metals from catalysts comprising alumina-containing carriers and metals, said process comprising:

a) collecting one or more catalysts, said catalysts containing one or more metals as metal sulfides wherein at least one of said metal sulfides is selected from the group consisting of molybdenum sulfides, vanadium sulfides, tungsten sulfides, and combinations thereof;

b) deoiling said catalysts;

c) leaching said deoiled catalysts in an atmospheric leach in the presence of air or oxygen at a pH greater than 9 for a time sufficient to convert in the range of about 50–70% of said metal sulfides to soluble metal and sulfur species, thereby forming a first leached slurry comprising a first liquid stream containing soluble metal and sulfur species and a first solid;

d) separating said first leached slurry into said first liquid stream and said first solid;

e) leaching said first solid in a pressure leach process in the presence of air or oxygen at a pH greater than 9 for a time sufficient to convert greater than about 90%, based upon the metal sulfides present on the catalysts before step (c), of said metal sulfides to soluble metal and sulfur species, thereby forming a second leached slurry comprising a second liquid stream containing soluble metal and sulfur species and a second solid;

f) separating said second leached slurry into said second liquid stream and said second solid;

g) collecting said first liquid stream and said second liquid stream to form a combined liquid stream;

h) oxidizing said combined liquid stream;

i) contacting the oxidized liquid stream with an organic solvent containing an extractant effective to transfer the soluble metal species into the organic solvent, thereby creating a metal species containing organic phase and a substantially metals-free aqueous liquid containing sulfate;

j) recovering said substantially metals-free aqueous liquid containing sulfate;

k) stripping the soluble metal species from the organic phase in the presence of an aqueous ammonia solution, thereby forming an aqueous phase containing metal species;

l) adjusting the pH of the aqueous phase to selectively precipitate at least one metal as at least one ammonium metal salt; and m) separating said at least one ammonium metal salt from said aqueous phase and recovering said at least one ammonium metal salt.

2. A process according to claim 1 wherein said atmospheric leaching step is conducted in the presence of caustic and oxygen at atmospheric pressure, a temperature less than about 60° C., and a pH range of about 10–13.

3. A process according to claim 1 wherein said pressure leaching step is conducted in the presence of caustic and oxygen at an oxygen partial pressure greater than about 10 psia, a temperature greater than about 70° C., and a pH greater than about 10.

4. A process according to claim 1 wherein said oxidizing step is conducted in the presence of oxygen or air or both.

5. A process according to claim 1 further comprising cooling said oxidized liquid stream and adjusting the pH of the oxidized liquid stream to about 6.5, thereby precipitating dissolved alumina; and separating said alumina from said oxidized liquid stream.

6. A process according to claim 1 wherein the pH of said oxidized liquid stream is adjusted to about 2.5 prior to step (i).

7. A process according to claim 1 further comprising leaching the second solid in an aqueous ammonia solution to place at least one metal in solution, thereby forming a metal-containing solution and a leached second solid; and subjecting the metal-containing solution to conditions sufficient to precipitate the at least one metal as at least one metal salt.

8. A process according to claim 1 wherein at least one metal sulfide is a vanadium sulfide and vanadium is precipitated as a first ammonium metal salt in step (l) and further comprising removing free ammonia from the aqueous phase of step (l); subjecting the aqueous phase to a pH effective in precipitating at least one additional metal as a second ammonium metal salt; separating said second ammonium metal salt from said aqueous phase; and recovering said second ammonium metal salt.

9. A process according to claim 1 wherein said catalysts are blended before step (b).

10. A process according to claim 1 wherein said catalysts are slurried with a caustic before step (c).

11. A process according to claim 1 wherein said first solid is slurried with fresh caustic before step (e).

12. A process according to claim 1 wherein said catalysts contain oil and coke.

13. A process according to claim 12 where said deoiling takes place in the presence of at least one organic solvent and further comprising stripping said solvent from said deoiled catalysts containing coke before step (c).

14. A process according to claim 13 wherein at least about 95% of said oil present on said catalysts containing coke is removed without removing said coke and at least about 95% of the solvent is stripped from said deoiled catalysts containing coke.

15. A process according to claim 14 wherein at least one of said catalysts is a petroleum refining catalyst.

16. A process according to claim 15 wherein at least one of said catalysts is an alumina-based hydrotreating catalyst.

17. A process according to claim 16 wherein at least one of said catalysts also contains metal sulfides selected from sulfides of cobalt, nickel, and combinations thereof.

18. A process according to claim 17 wherein said catalysts are selected from the group consisting of a hydrodesulfurization catalyst, a residual catalyst, and combinations thereof.

19. A process according to claim 18 wherein said metal sulfide include sulfides of molybdenum and/or sulfides of vanadium.

20. A process according to claim 19 wherein said catalysts are slurried with a caustic before step (c) and said first solid is slurried with fresh caustic before step (e), and wherein said slurrying steps are each conducted at a pH in the range of about 10–12 and at conditions effective in controlling oxidation.

21. A process according to claim 19 wherein oxidation of said liquid stream is conducted at a temperature greater than about 150° C. and a pH of the oxidized liquid stream is controlled to greater than about 6.5.

22. A process according to claim 7 further comprising removing entrained ammonia from said leached second solid to yield an alumina residue.

23. A process to reclaim metals from catalysts comprising alumina-containing carriers and metals, said catalysts containing oil, said process comprising:

a) collecting one or more catalysts, said catalysts containing two or more metals as metal sulfides wherein at least two of said metal sulfides are selected from the group consisting of molybdenum sulfides and vanadium sulfides, and tungsten sulfides and vanadium sulfides;

b) deoiling said catalysts;

c) leaching said deoiled catalysts in the presence of caustic and oxygen at atmospheric pressure, a temperature less than 60° C., and a pH range of about 10–13 for a time sufficient to convert in a range from about 50–70% of said metal sulfides to soluble metal and sulfur species, thereby forming a first leached slurry comprising a first liquid stream containing soluble metal and sulfur species and a first solid;

d) separating said first leached slurry into said first liquid stream and said first solid, e) leaching said first solid in the presence of caustic and oxygen at an oxygen partial pressure greater than 10 psia, a temperature greater than about 70° C., and a pH greater than about 10 for a time sufficient to convert greater than about 90% of the metal sulfides to soluble metal and sulfur species based upon the metal sulfides present on the catalysts catalyst before step (c), thereby forming a second leached slurry comprising a second liquid stream containing soluble metal and sulfur species and a second solid;

f) separating the second leached slurry into said second liquid stream and said second solid;

g) collecting said first liquid stream and said second liquid stream to form a combined liquid stream;

h) oxidizing said combined liquid stream in the presence of oxygen or air or both, thereby forming an oxidized liquid stream;

i) cooling said oxidized liquid stream and adjusting a pH of the oxidized liquid stream to about 6.5, thereby precipitating dissolved alumina, and separating said alumina from said oxidized liquid stream;

j) adjusting the pH of the oxidized liquid stream to a pH of about 2.5;

k) contacting the oxidized liquid stream with an organic solvent containing an extractant effective to transfer the soluble metal species into the organic solvent, thereby creating an organic phase containing at least one soluble metal species and a substantially metals-free aqueous liquid containing sulfate;

l) recovering said substantially metals-free aqueous liquid containing sulfate;

m) stripping the soluble metal species from the organic phase in the presence of an aqueous ammonia solution, thereby forming an aqueous phase containing metal species;

n) adjusting the pH of the aqueous phase to selectively precipitate at least one metal as at least one ammonium metal salt; and o) separating said at least one ammonium metal salt from said aqueous phase and recovering said at least one ammonium metal salt.

24. A process according to claim 23 further comprising leaching the second solid in an aqueous ammonia solution to place at least one metal in solution, thereby forming a metal-containing solution and a leached second solid; and subjecting the metal-containing solution to conditions sufficient to precipitate the at least one metal as at least one metal salt.

25. A process according to claim 23 wherein vanadium is precipitated as a first ammonium metal salt in step (m) and further comprising removing free ammonia from the aqueous phase of step (n); subjecting the aqueous phase to a pH effective in precipitating a second metal as a second ammonium metal salt; separating said second ammonium metal salt from said aqueous phase; and recovering said second ammonium metal salt.

26. A process according to claim 23 wherein said catalysts are blended before step (b).

27. A process according to claim 23 wherein said catalysts are slurried with a caustic before step (c).

28. A process according to claim 23 wherein said first solid is slurried with fresh caustic before step (e).

29. A process according to claim 23 wherein said catalysts contain oil and coke, and wherein said deoiling takes place in the presence of at least one organic solvent, and further comprising stripping said solvent from said deoiled catalysts containing coke before step (c).

30. A process according to claim 29 wherein at least about 95% of said oil present on said catalysts containing coke is removed without removing said coke and at least about 95% of the solvent is stripped from said deoiled catalysts containing coke.

31. A process according to claim 30 wherein at least one of said catalysts is a petroleum refining catalyst.

32. A process according to claim 31 wherein at least one of said catalysts is a hydrotreating catalyst.

33. A process according to claim 32 wherein said catalysts also contain metal sulfides selected from sulfides of cobalt, nickel, and combinations thereof.

34. A process according to claim 32 wherein said catalysts are selected from the group consisting of hydrodesulfurization catalysts, residual catalysts, and combinations thereof.

35. A process according to claim 34 wherein said catalysts are slurried with a caustic before step (c) and said first solid is slurried with fresh caustic before step (e), and wherein said slurrying steps are each conducted at a pH in the range of about 10–12 and at conditions to control oxidation.

36. A process according to claim 34 wherein said oxidizing step is conducted at a temperature greater than about 150° C. and a pH of the oxidized liquid stream is controlled to greater than about 6.5.

37. A process according to claim 24 further comprising removing entrained ammonia from said leached second solid to yield an alumina residue.

* * * * *